No. 848,450. PATENTED MAR. 26, 1907.
E. G. DELOE.
FISH CUTTING AND DRESSING MACHINE.
APPLICATION FILED JULY 27, 1906.
4 SHEETS—SHEET 1.
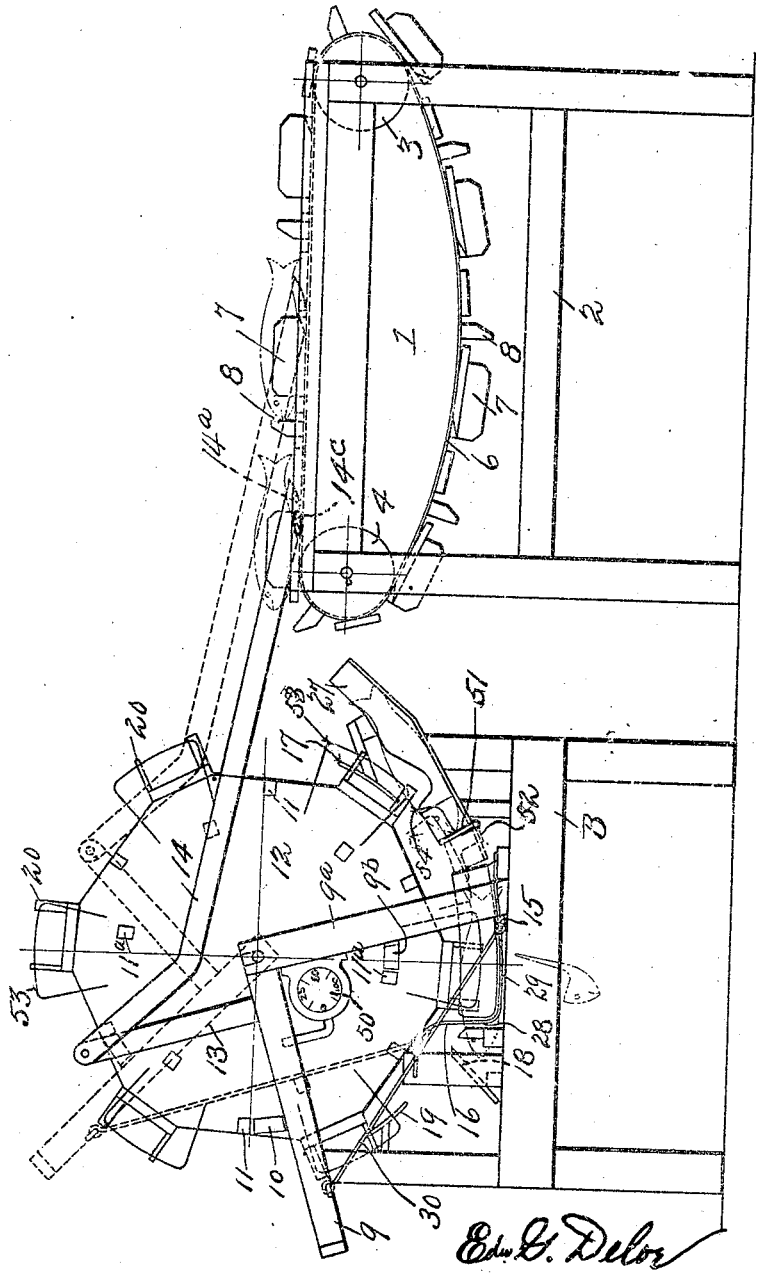

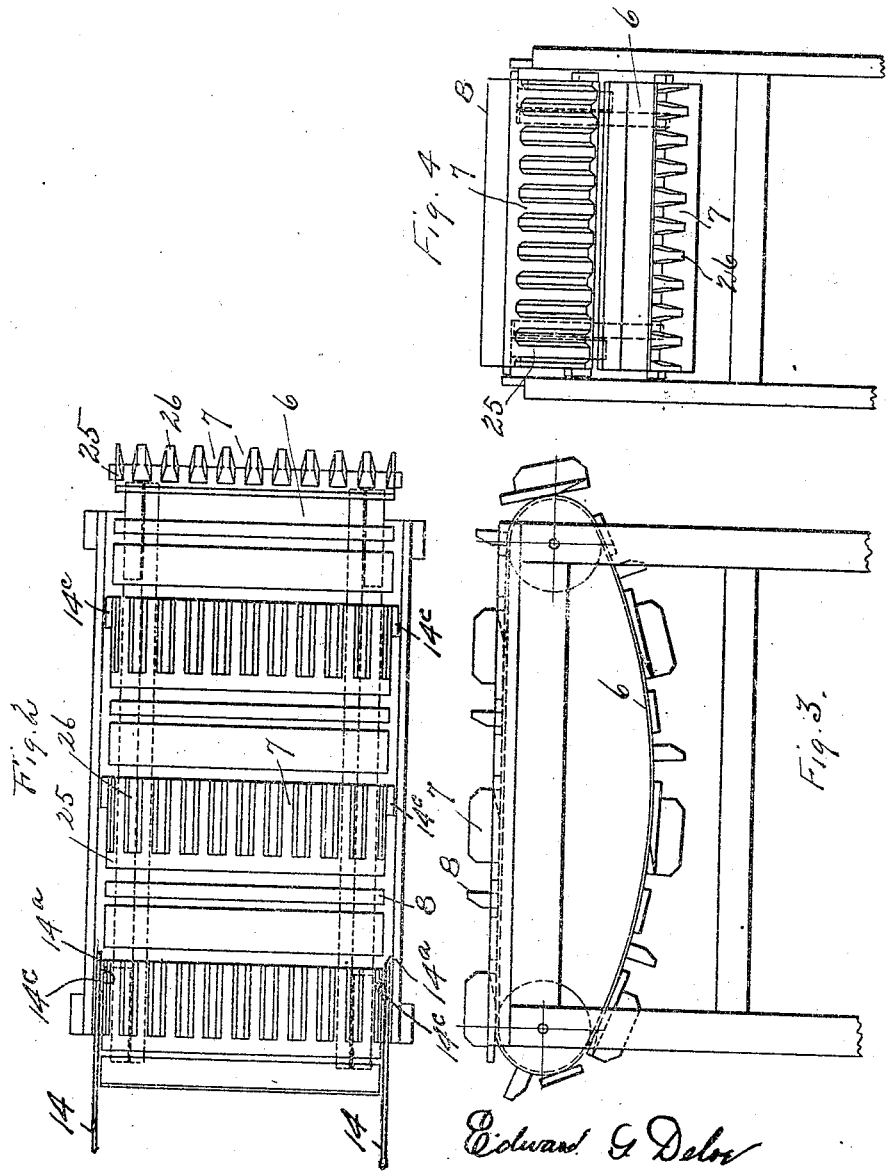

No. 848,450.
PATENTED MAR. 26, 1907.
E. G. DELOE.
FISH CUTTING AND DRESSING MACHINE.
APPLICATION FILED JULY 27, 1906.
4 SHEETS—SHEET 3.
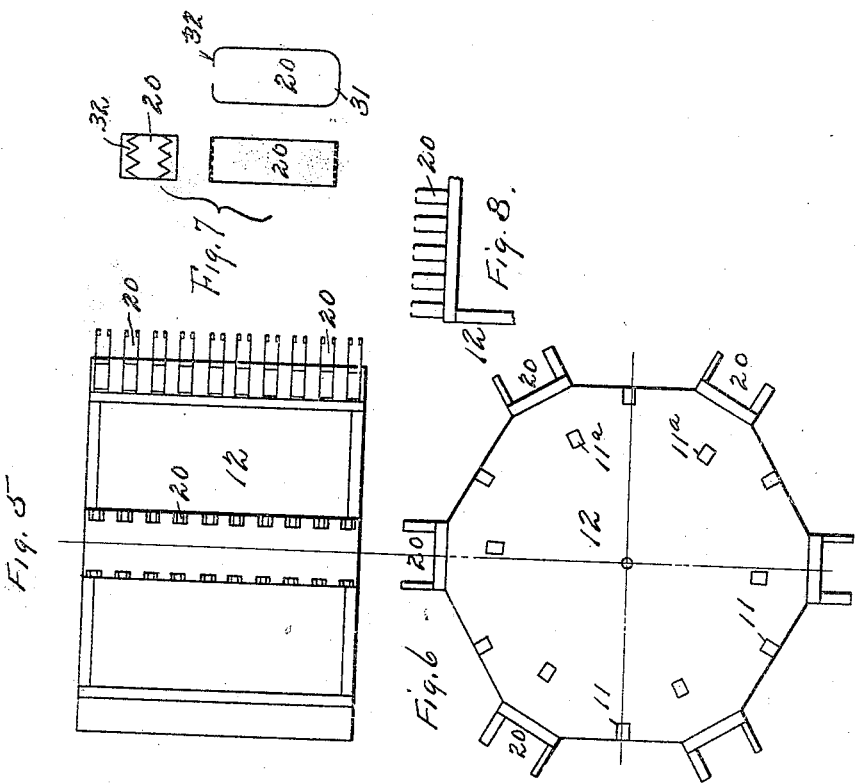
WITNESSES:
Edward G. Deloe
INVENTOR
BY
Norman E. Ger
Attorney

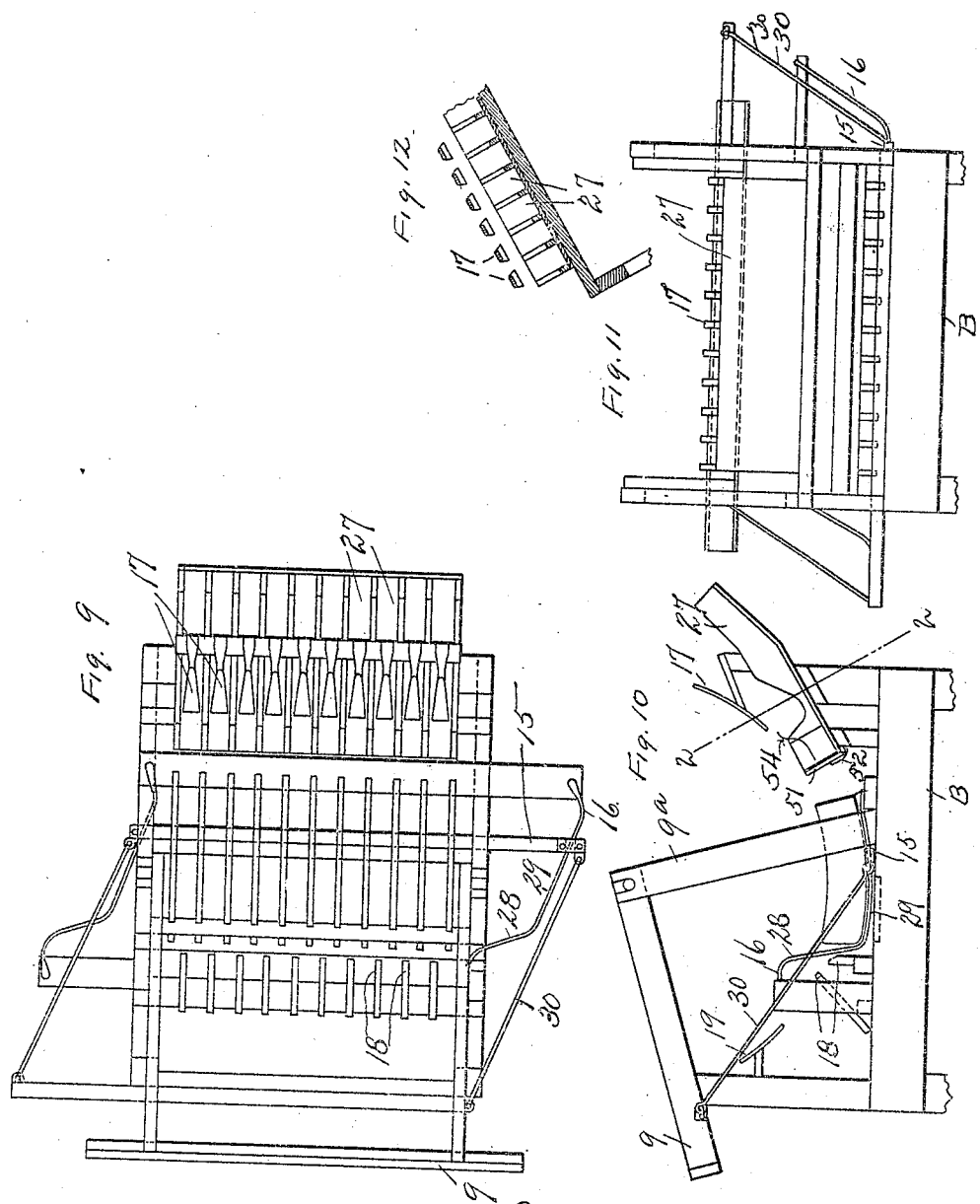

UNITED STATES PATENT OFFICE.

EDWARD G. DELOE, OF ROARING SPRING, PENNSYLVANIA.

FISH CUTTING AND DRESSING MACHINE.

No. 848,450.             Specification of Letters Patent.        Patented March 26, 1907.

Application filed July 27, 1906. Serial No. 328,065.

*To all whom it may concern:*

Be it known that I, EDWARD G. DELOE, a citizen of the United States, residing at Roaring Spring, in the county of Blair and State of Pennsylvania, have invented certain new and useful Improvements in Fish Cutting and Dressing Machines, of which the following is a specification.

This invention relates to improvements in fish cutting and dressing machines of the type which are designed to receive fish, pass them from a receiving-table to a revolving wheel carrying clamping devices holding the fish firmly while the heads are removed and the intestinal cavity thoroughly cleaned.

To this end the invention has for its object the production of a machine for performing the above operations in a simple automatic manner, whereby a plurality of fish can be cleaned by one operation in a short interval of time.

While in the embodiment illustrated in the drawings the machine is more particularly adapted to the use of cleaning herring, the improved construction provides means whereby other kinds of fish can as easily be thoroughly cleaned by simply changing the form of the rake that cleans the intestinal cavity, together with rearranging the knife to operate in sections, one knife to operate on each fish.

Broadly speaking, the improved machine consists of an endless receiving-table where the fish are arranged in rows with their heads toward a revolving wheel and their backs being uppermost. Immediately in front of this endless carrier is placed the said revolving drum or wheel, which has secured to its outer longitudinal surface clamping devices which serve to hold the fish firmly while carried to the knife that severs the heads, and after the intestinal cavity has been thoroughly cleaned means are provided whereby the fish are deposited automatically in a receiving-chamber.

The following description explains in detail the scope of these improvements and the manner in which I construct and apply the same in the production of a machine for the purpose described, reference being had to the following drawings, in which—

Figure 1 is a complete side elevation of the fish-cutting machine in connection with the endless fish-carrier which serves to transfer the fish to the revolving drum. Figs. 2, 3, and 4 are plan, side, and end elevational views of the endless carrier, showing more in detail the fish-holding pockets. Figs. 5 and 6 are plan and elevational views of the dissecting wheel or drum, showing the locking-lugs located upon the vertical side of the drum. Fig. 7 shows a group of detail elevations of one of the U-shaped clamping devices. Fig. 8 is a detail elevation showing the U-shaped clamping devices attached to a clamp-support. Fig. 9 shows a plan view of the bed or concave of the machine with the drum removed, and illustrating more particularly the spreading devices to open the clamps that hold the fish, together with the manner of mounting the knife that severs the heads and takes a portion from the under side of the fish, as shown in Fig. 1 of the drawings. Fig. 10 is a side elevational view of the machine-bed shown in Fig. 9, said view illustrating the method of attaching the knife to the operating-handle of the bed. Fig. 11 is a side elevational view of the parts shown in Fig. 10. Fig. 12 is a sectional view on the line 2 2 of Fig. 10, showing the separate compartments for each fish.

Similar letters refer to similar parts throughout the drawings.

The endless fish-carrier that first receives the fish is designated in its entirety by the numeral 1. This carrier is mounted upon a framework 2, that supports two drums 3 and 4, over which travels the endless carrier-belt 6. This fish-carrier is made such that a plurality of fish can be placed in the pockets 7 with their heads resting against the spacing-block 8, as plainly shown in Fig. 1 of the drawings. This endless carrier-belt 6 is preferably made of some flexible material, such as belting, upon which is placed the spring-blocks for the fish, together with the narrow strips that form pockets 7. In this connection it will be observed by reference to Figs. 2, 3, and 4 of the drawings that the endless belt 6 is equipped with a plurality of transverse carrying-slats 25, each of which is provided thereon with a series of the said fish-holding pockets 7, which are of an upwardly-flaring shape to provide for holding the fish in the manner previously referred to. At one side of each transverse series of the longitudinally-disposed fish-holding pockets 7' the carrier-belt 6 has mounted thereon a transverse upstanding block constituting the aforesaid spacing block or stop 8, against which the head of the fish come in contact, as plainly shown in Fig. 1 of the drawings.

The fish having been placed upon the endless carrier 1, the operator takes the handle 9 and raises it so the latch 10 engages the lugs 11, secured to the vertical side of the transfer-drum 12, which thus begins to revolve as handle 9 is pressed downward. This revolution of the drum in connection with the movement of the arm 13 and link 14 serves to facilitate the movement of the endless carrier 1. This construction constitutes what may be termed a "ratchet-operating" mechanism for the transfer-drum, and in addition to the feeding latch or dog 10, which successively engages the spaced lugs 11 as the handle 9 is swung up and down, the handle or frame supports 9ª have mounted thereon check-dogs 9ᵇ, which engage other lugs 11ª and prevent backward rotation of the drum when the handle is moved to a position for the feeding dogs or latches 10 to engage the next lugs. Also this ratchet-operating mechanism includes the said links 14, which are provided with beveled shouldered engaging ends 14ª, which ride over and engage with the catch projections 14ᶜ, provided at the sides of the endless fish-carrier. Hence the reciprocation of the links or pull-arms 14 necessarily provides for a movement of the carrier to bring the fish to a position where they fall into the receiving-chutes 27 at the receiving side of the fixed machine-bed B, over which the drum or wheel 12 is supported to rotate.

A downward movement of the handle actuates a knife 15, which travels on a guiding-cam 16, thus severing the heads from the fish, together with a strip from the under side, as plainly shown by the dotted fish-section in Fig. 1 of the drawings. The dissecting-knife 15 is arranged transversely of the machine-bed B and slidably works at its ends upon the guiding-cams 16, which are formed with upright sections 28 and lower approximately horizontal sections 29, upon both of which the knife slides. The downward movement of the knife upon the upright sections 28 of the guiding-cams serves to sever the head portion of the fish, while the knife as it travels along the bottom section of the cams in an approximately horizontal direction takes off a strip from the under side of the fish, and hence opens up the intestinal cavity.

The extremities of the knife or knife-bar 15 have connected therewith the lower ends of operating-links 30, the upper ends of which links are connected with the vertically-swinging handle or handle-frame 9.

The downward movement of the knife actuates the link 14, which moves the endless carrier 6 forward, depositing fish to be operated upon in said receiving-chutes 27. The clamping devices 20 in the drum 12 pass over fixed clamp-spreaders 17 and catch the fish immediately behind the gills, holding it firm to be cut. The said clamping devices or fish-clamps 20 are in the form of U-shaped spring-clips, having inturned toothed gripping-flanges 32 at their terminals for clutching the sides of the fish and carrying them from the receiving-chutes 27 past the knife 15 and onto the intestinal rake 18. The spreaders 17 are arranged in a fixed position above the chutes 27 and act as cams, which pass within the fish-clamps 20 and open up the jaws thereof sufficiently to permit the same to spring over and into engagement with the fish while such fish lie in the receiving-chutes 27.

It will be noticed that one downward movement of the handle 9 serves to cut the fish that are in the machine and also to deposit more fish in the receiving-chutes to be caught by the clamps. After the fish have their heads severed and a strip taken from the under side a partial revolution of the drum will bring the inside of the fish in direct contact with a fixed rake 18, which removes everything from the intestinal cavity. With another partial revolution of the wheel or drum the clamps pass over the fixed spreaders 19 and the fish operated upon is deposited in a receiving receptacle or chamber. It will be observed that the fixed spreaders 19 are arranged beyond the fixed rake 18 directly in the path of the spring fish-clamps 20, so that the latter will pass over the said spreaders 19, and thereby become forced open, so as to release the cut and cleaned fish.

A suitable register or counter 50 is suitably mounted on the machine-frame and operatively engages the wheel, so that each time the latter moves forward an accurate register or count of the fish is made as fast as they pass through the machine.

It will be further observed that when the fish are deposited in the chutes 27 preparatory to being caught by the clamps 20 there is provided a shutter or flap-door 51, which is held against the lower end of the chute by the spring 52. When the drum 12 is revolved, the guide-wire 53 thereon engages the hook 54, which is attached to the shutter 51, and as the drum continues to revolve, the hook 54 being engaged with the guide-wire 53, the shutter gradually assumes the position shown in the dotted lines. This automatic action thus allows the fish to pass to the knife. With a further revolution of the drum the hook 54 becomes disengaged with the guide-wire 53 and the shutter 51 assumes its normal position, ready to retain the fish that are deposited in the chutes 27 by the endless fish-carrier.

It is thought that from the foregoing description the many advantages of the herein-described fish cutting and dressing machine are readily apparent.

I claim—

1. In a fish cutting and dressing machine, a fish-carrier, a rotatable transfer-drum carrying fish-clamps, means for opening said clamps at different points, means for holding the fish below the drum, a dissecting-knife arranged to move in two paths, an intestinal rake arranged beyond the knife, and an operating mechanism comprising means for rotating the drum, moving the fish-carrier, and reciprocating the knife.

2. In a fish cutting and dressing machine, an endless fish-carrier having a series of fish-holding pockets and spacing-blocks adjacent thereto, a rotatable transfer-drum carrying a series of U-shaped spring fish-clamps having gripping edges, fixed spreaders arranged at different points and adapted to pass through said clamps for opening the same, a series of stationary receiving-chutes arranged to receive the fish from the carrier and adapted to hold the fish in position for being caught up by the clamps, guiding-cams having upright and horizontal sections, a reciprocating knife movable upon said cams and directed thereby for severing the head and a bottom strip from the fish-body, and an operating mechanism comprising a swinging handle having operating connections with said knife, a ratchet engagement with the drum for rotating the same, and a pull-rod connection with the endless carrier for moving the latter.

3. In a fish cutting and dressing machine, a fish-carrier, a rotatable transfer-drum carrying fish-clamps, spreaders for opening said clamps at different points, a shutter for holding the fish in the chutes, adapted to be automatically opened and closed with the revolution of the drum, a spring for operating the shutter, means whereby the shutter is not opened until the fish are clamped, a dissecting-knife arranged to move in two paths, an intestinal rake arranged beyond said knife, and an operating mechanism comprising means for rotating the drum, moving the fish-carrier, and reciprocating the knife.

In testimony whereof I hereunto affix my signature in the presence of two witnesses.

EDWARD G. DELOE.

Witnesses:
 NORMAN E. GEE,
 GEO. M. METZ